(12) United States Patent
Billberg et al.

(10) Patent No.: US 6,923,507 B1
(45) Date of Patent: Aug. 2, 2005

(54) UTILITY VEHICLE DUMP BOX

(75) Inventors: Rusty Billberg, Wannaska, MN (US);
Karolyn Eastman, Roseau, MN (US)

(73) Assignee: Polaris Industries Inc., Medina, MN (US)

( * ) Notice: Subject to any disclaimer, the term of this patent is extended or adjusted under 35 U.S.C. 154(b) by 12 days.

(21) Appl. No.: 10/458,868

(22) Filed: Jun. 11, 2003

(51) Int. Cl.$^7$ .................. B62D 33/02; B62D 33/023
(52) U.S. Cl. ..................... 298/17 R; 296/183.2
(58) Field of Search .................. 298/17 R, 23 R; 296/183.2, 183.1, 182.1, 10, 36, 50, 51, 56, 296/57.1

(56) References Cited

U.S. PATENT DOCUMENTS

| | | | |
|---|---|---|---|
| 97,808 A | * | 12/1869 | Powell et al. ............. 296/50 |
| 109,965 A | * | 12/1870 | Stocking et al. .......... 296/50 |
| 623,339 A | | 4/1899 | Skimin et al. ............ 16/163 |
| 1,097,395 A | | 5/1914 | Cullen ...................... 16/163 |
| 1,178,768 A | | 4/1916 | Wells ........................ 16/163 |
| 1,538,127 A | * | 5/1925 | McKinley ................. 298/17.5 |
| 1,597,105 A | * | 8/1926 | Pardee ....................... 296/50 |
| 1,883,473 A | | 10/1932 | Barrett ....................... 16/163 |
| 1,893,532 A | | 1/1933 | Ball ............................ 16/163 |
| 2,246,358 A | | 6/1941 | Jelinek et al. .............. 16/163 |
| 2,278,450 A | | 4/1942 | Jones .......................... 296/24 |
| 2,720,413 A | | 10/1955 | Halverson ................... 296/10 |
| 2,908,529 A | | 10/1959 | Davidson ................... 296/56 |
| 3,544,154 A | | 12/1970 | Ford ........................... 296/56 |
| 3,785,695 A | * | 1/1974 | Conkle ....................... 296/50 |
| 3,841,690 A | * | 10/1974 | Piercy ........................ 296/10 |
| 4,029,355 A | | 6/1977 | Wilhelmsen ............... 296/57 R |
| 4,140,327 A | | 2/1979 | Hackney, III .............. 280/163 |
| 4,887,836 A | | 12/1989 | Simjian ..................... 280/651 |
| 5,029,927 A | * | 7/1991 | Totani ........................ 296/50 |
| 5,997,067 A | | 12/1999 | Shambeau et al. ........ 296/57.1 |
| 6,237,981 B1 | | 5/2001 | Selleck ....................... 296/66 |
| 6,644,708 B1 | * | 11/2003 | Grzegorzewski et al. ... 296/32 |
| 6,851,756 B2 | * | 2/2005 | Pieschel ...................... 298/2 |
| 2004/0232726 A1 | * | 11/2004 | Legge ........................ 296/182.1 |

FOREIGN PATENT DOCUMENTS

| | | | |
|---|---|---|---|
| DE | 019607755 | * | 9/1996 |
| EP | 000771718 | * | 5/1997 |
| EP | 1215107 | * | 6/2002 |
| JP | 411278313 | * | 10/1999 |

* cited by examiner

Primary Examiner—H. Gutman
(74) Attorney, Agent, or Firm—Fredrikson & Byron, P.A.

(57) ABSTRACT

A dump box for a utility vehicle having a forward cab portion and a rearward bed portion. The dump box includes a dump box bed having a front end, first and second sides, and a rear end. A front panel is provided at the front end, the front panel dividing the cab portion of the utility vehicle from the bed portion of the utility vehicle. First and second side walls are provided that are adjustable between a first position along the sides and a second position along the front panel. A tailgate is provided at the rear end of the utility vehicle. The tailgate may be configured for rotation from both the upper and lower margin. Limiting structures may be used to limit the opening of the tailgate from the upper margin. Further, the tailgate may include a support for supporting the tailgate in an open, horizontal position.

34 Claims, 7 Drawing Sheets

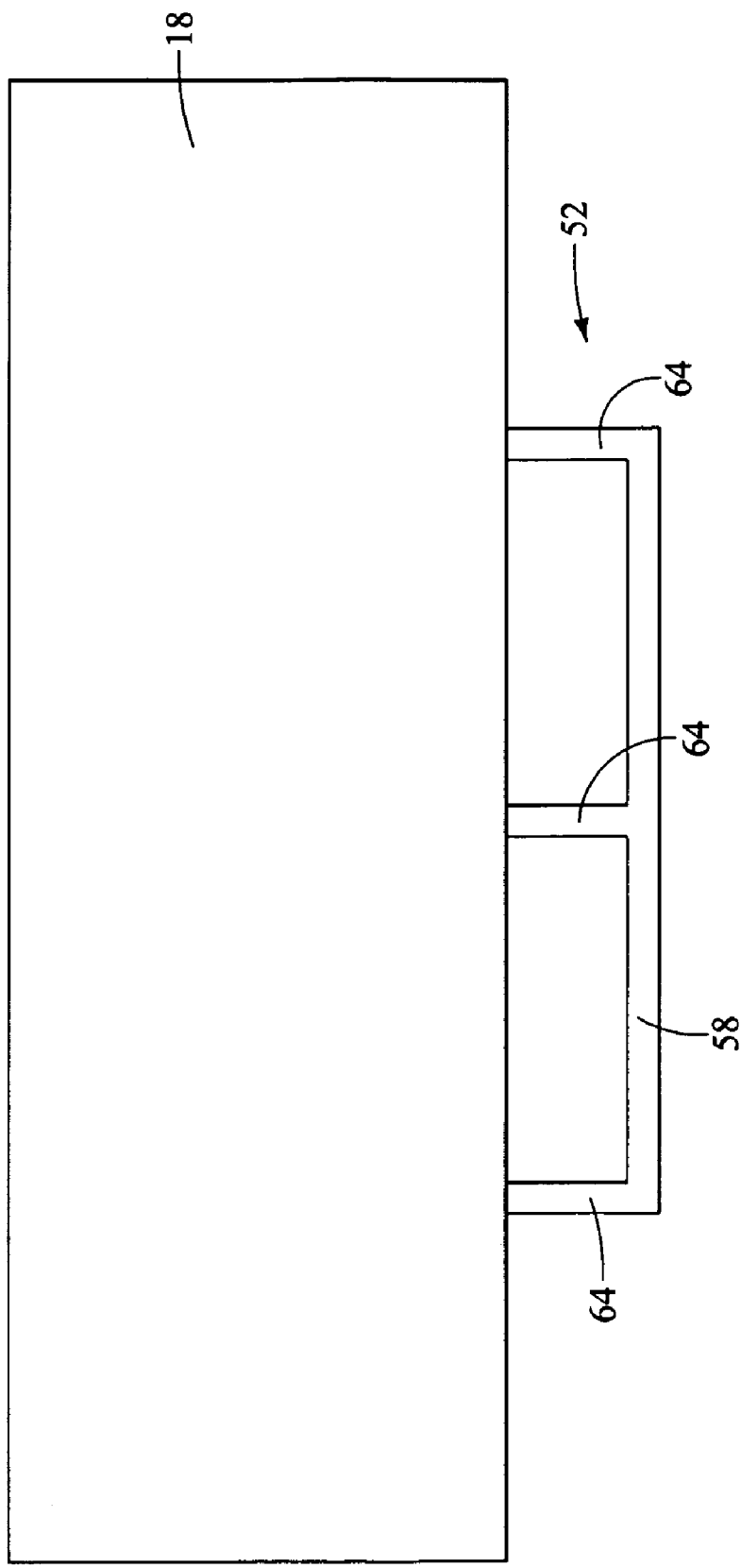

UTILITY VEHICLE DUMP BOX

FIELD OF THE INVENTION

The present invention relates to dump boxes on vehicles, and in particular to such a dump box on an off-road utility vehicle.

BACKGROUND OF THE INVENTION

Off-road utility vehicles often have dump boxes that may be loaded with cargo. These dump boxes are also commonly referred to as cargo boxes or cargo beds. The dump boxes may be used to hold most sorts of cargo and may be configured for hauling cargo and/or for dumping cargo.

The dump box may be used as a bed for holding large items. In the event that an item to be held cannot fit within the confines of the dump box, the dump box walls may be configured to collapse, fold, be removed, or otherwise be adjustable such that the dump box provides an at least partially unconfined bed. More specifically, it may be desirable to move the side walls of the dump box. Typically adjustment of the side walls has been accomplished either by pivoting the side walls along a horizontal axis such that they fold inwardly onto the dump box bed or outwardly to a generally vertical position beneath the plane of the dump box bed or by removing the side walls. Folding the side walls inwardly onto the dump box bed causes the resultant surface to be uneven, varying between the height of just the bed and the height of the bed with the side wall folded thereupon. Folding the side walls outwardly to a generally vertical position beneath the plane of the dump box bed may interfere with driving or free movement of the wheels of the utility vehicle. When removing the side walls entirely, it is necessary to find storage space for the side walls. Despite these concerns, collapsing or removing the side walls may still be desirable as objects that would not fit within the confines of the dump box bed can be loaded onto the dump box.

In some situations, the dump box may hold a volume of loose cargo, such as gravel, or material of which the component parts are large and have a tendency to cling together. When transporting, and particularly unloading, such cargo, it may be desirable for the dump box to have a mechanical or electromechanical lift mechanism to tip the box backwards and dump the cargo from the box.

Traditionally, tailgates are configured for opening in one of two ways: from the lower margin or from the upper margin. Opening from the lower margin is preferable for dumping cargo from a tailgate. When opening from the lower margin, a restraint may be employed to limit the amount of opening. When opening from the upper margin, the tailgate typically folds outwardly and extends the surface area of the dump box bed. Regardless of whether it is designed to open at the upper or lower margin, the tailgate typically hinges at that margin to allow the tailgate to pivot about the horizontal of the opposite margin between closed and open positions.

With particular reference to a tailgate configured for opening from the lower margin for dumping material, the gate is designed to open outwardly and to shift bodily upward from the truck body in order to give the greatest possible dumping opening. However, as noted above, it may be desirable to include a restraint to limit the amount of opening according to the cargo being unloaded. Spreader chains are often used for this purpose. By employing spreader chains, the amount of opening of the lower margin of the tailgate can be limited, thereby limiting the rate of discharge of contents from the dump body. Chain holders can be used to set the amount of gate opening upon dumping by selecting the chain links placed in the holder. Typical chain holders comprise an opening in right and left rear corner posts of the dump body, the upper end of the opening being sufficiently large to admit the chain readily, and the lower portion being sufficiently narrow to prevent passage of links of the chain therethrough transverse to the plane of the apertured post face. Various configurations of chain holders, including those projecting from the rear of the dump box, have been developed.

With particular reference to a tailgate configured for opening from the upper margin for unloading cargo, the gate is designed to open outwardly and set on a plane approximately level with the dump box bed. Typically, a latch is provided at each upper corner of the tailgate for retaining the tailgate in its closed position and a flexible element, such as a cable, extends between each upper corner and the upper rear portion of each sidewall of the box for retaining the tailgate in an open position wherein it forms a horizontal extension of the dump box bed.

SUMMARY OF THE INVENTION

The invention provides a utility vehicle dump box having a configuration capable of adjustment to suit specific cargo carrying needs. The utility vehicle dump box includes adjustable side walls for dump box to flat bed conversion and may alternately include either of or a combined double swing tailgate and self-supporting tailgate.

The dump box includes a bed having a front end, two sides, and a rear end. The front end is walled by a front panel, the rear end is walled by a tailgate and the two sides are walled with adjustable side walls. The adjustable side walls may be moved by pivoting them along a generally vertical axis to a position parallel with and generally against the front panel of the dump box.

In an embodiment where a self-supporting tailgate is desired, the tailgate is configured such that it is supported in its horizontal position. The tailgate includes a lower support for providing functional support for the tailgate in a flat, horizontal position. The self-supporting tailgate is particularly useful with the adjustable sidewalls insofar as the sidewalls cannot support chains or other devices for supporting the tailgate when the sidewalls are in a position along the front panel.

In an embodiment having a double swing tailgate, the tailgate may be rotated upwardly or downwardly. The upward rotation of the tailgate may be limited to control cargo dumping.

The utility vehicle dump box of the present invention having adjustable side walls may be provided with a tailgate that double swing capabilities and/or is self-supporting.

BRIEF DESCRIPTION OF THE DRAWINGS

FIG. 7 is an rear view of a self-supporting tailgate of the present invention.

DETAILED DESCRIPTION OF THE INVENTION

Figure 1:
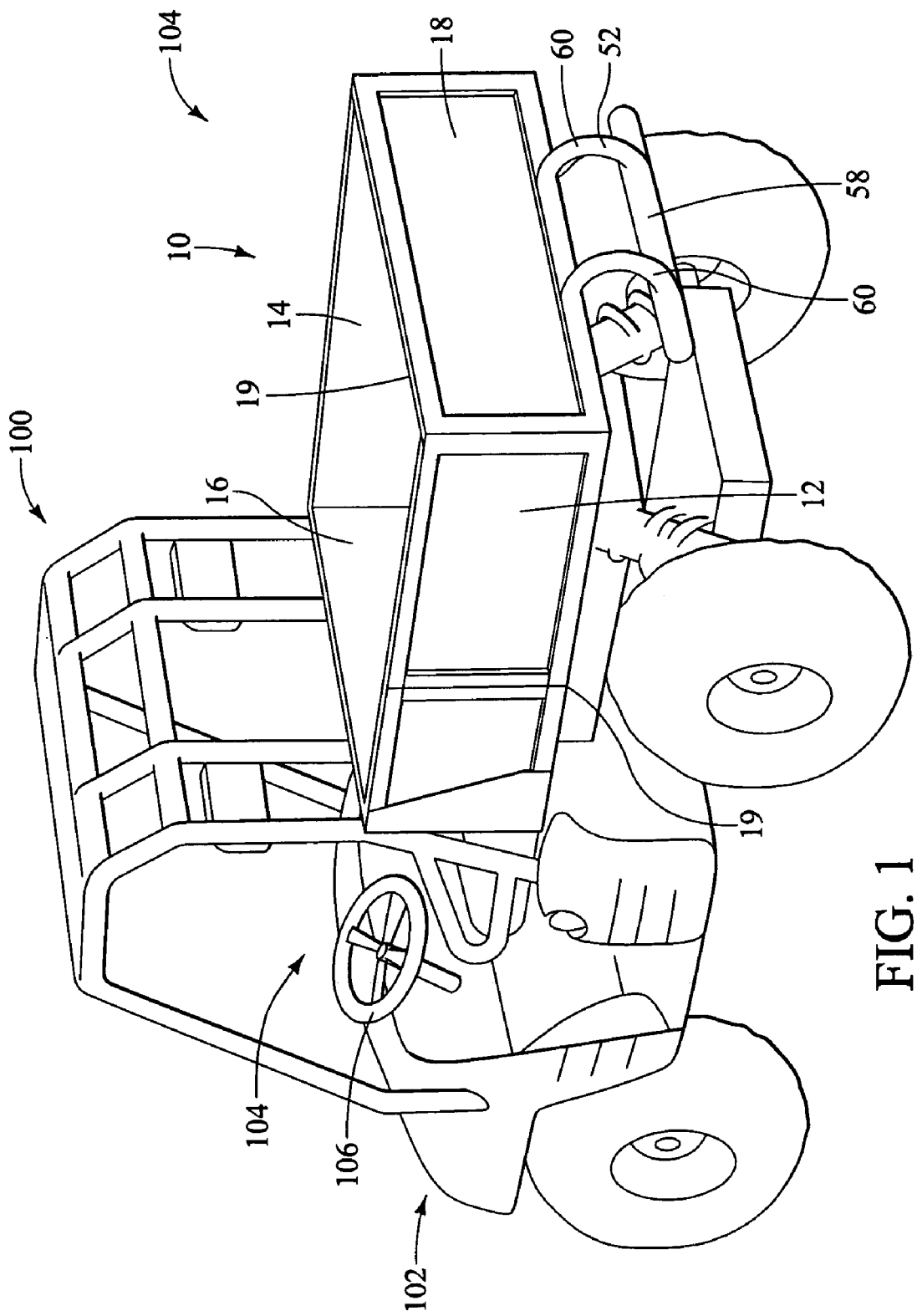
FIG. 1 is a view of an off-road utility vehicle having a dump box in accordance with the present invention.

The utility vehicle dump box of the present invention is generally designated 10 and is usable on conventional off-road utility vehicles, such as shown in FIG. 1. The utility vehicle 100 is a versatile light duty off-road vehicle having off-road power, comfort, and all-purpose utility features. The utility vehicle 100 is ideal for landscaping work, hauling (feed, materials, equipment, tools, lumber), dragging, towing (small implement, mower, trailer, or wagon) and simply for fun. The utility vehicle 100 has approximately 850 to 1,000-lb. cargo box capacity, 1,400 to 1,500-lb. hitch towing capacity, and 1,400 to 1,500-lb. payload capacity.

As seen in FIG. 1, the utility vehicle 100 generally comprises a forward cab portion 102 and a rearward bed portion 104 and is typically four-wheeled. Alternately, the utility vehicle 100 may be provided in a six-wheeled configuration. The utility vehicle 100 may have two-, four-, or six-wheel drive and can be used on existing turf, on trails, and on unforgiving rough terrain. The cab portion 102 includes an operator area 104 having a steering control 106 and seating, typically a bench seat, for two to three riders. The cab portion 102 may be open, as shown, or may be closed.

Figure 3:
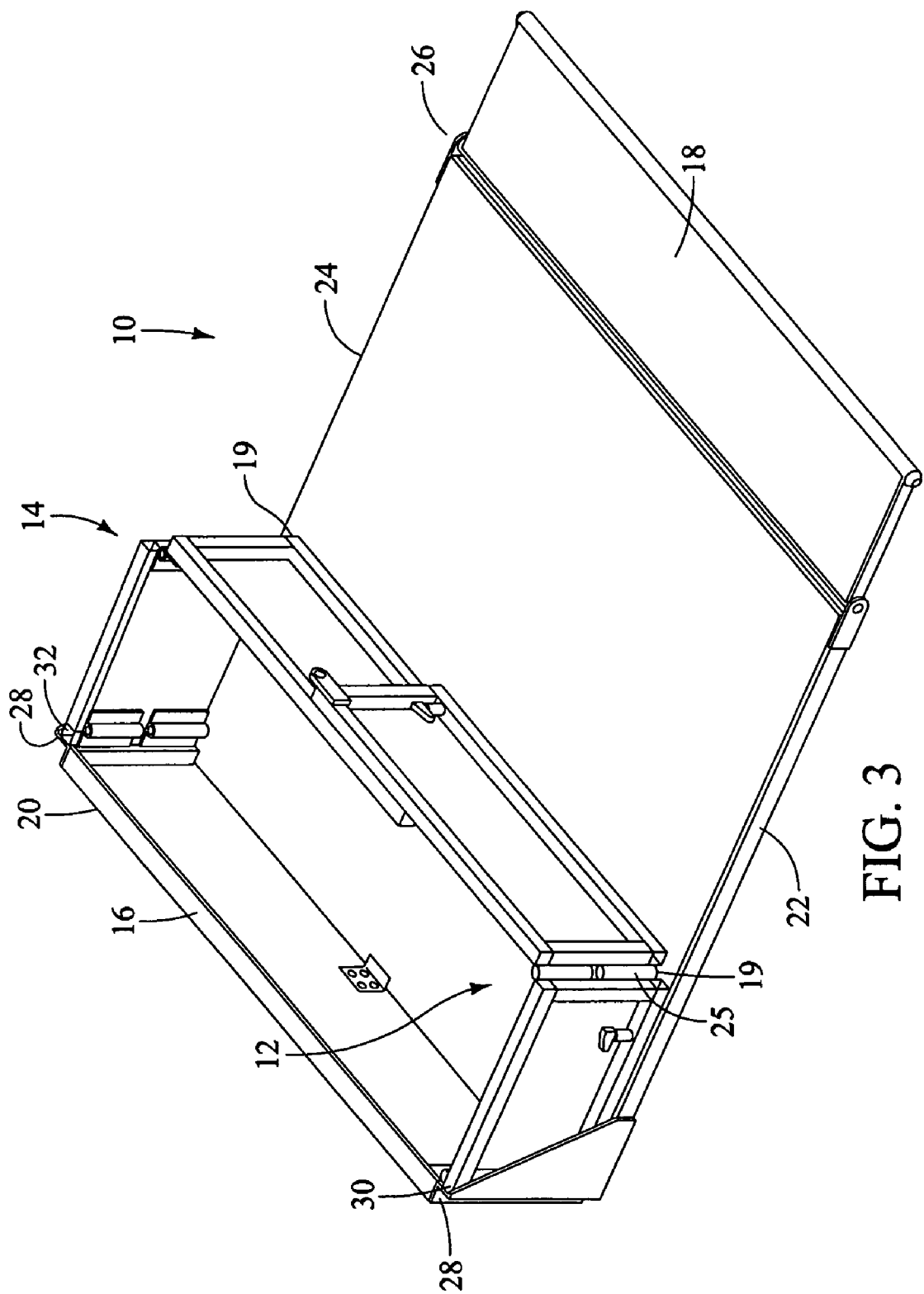
FIG. 3 is a perspective view of the dump box of the present invention reconfigured into a truncated dump box and partial flatbed.

The utility vehicle dump box 10 of the present invention includes first and second side walls 12, 14, a front panel 16, and a tailgate 18. The side walls 12, 14, front panel 16, and tailgate 18 form a closed perimeter around a dump box bed 11. Each of the side walls 12, 14, front panel 16, and tailgate 18 are preferably formed of metal, plastic or other suitable material. A preferred embodiment is constructed of steel. The front panel 16 abuts the cab 102 of the utility vehicle 100 and the side walls 12, 14 are designed to be folded generally parallel with and along the front panel 16. The front panel 16 generally divides the forward cab portion 102 of the utility vehicle 100 from the rearward bed portion 104 of the utility vehicle 100. A separate front panel, however, is not required. Instead, the rear of the forward cab portion 102 may double as a front panel. The side walls 12, 14 may divided and hinged (or otherwise provided with a pivot point), as seen at 19, to enable reconfiguring the dump box into a smaller box, as seen in FIG. 3. The tailgate 18 includes a support 52 for supporting the tailgate 18 in an open, horizontal position. Spring pins (not shown) are provided at each upper corner of the tailgate 18 for retaining the tailgate 18 in its closed position. Corresponding holes are provided in the side walls 12, 14 for receiving the spring pins from the tailgate 18. Of course, any suitable structure for retaining the tailgate 18 in its closed position may be used.

Figure 2:
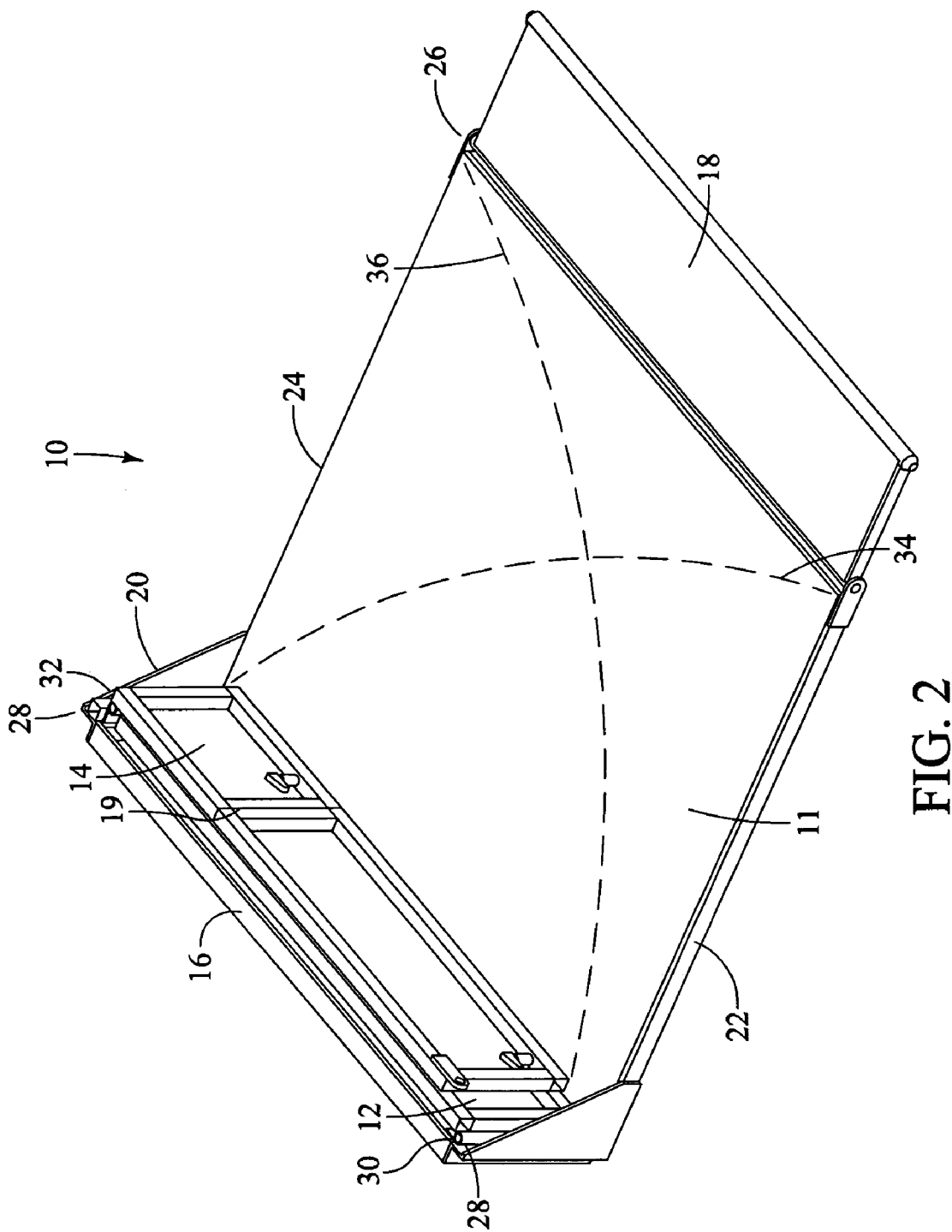
FIG. 2 is a top view of a dump box reconfigured to a flatbed in accordance with a preferred embodiment of the present invention.

FIG. 2 shows a top view of a dump box 10 reconfigured to a flatbed in accordance with the present invention. The dump box includes a dump box bed 11 having a front end 20, two sides 22, 24, and a rear end 26. The front end 20 is walled by the front panel 16, the rear end 26 is walled by the tailgate 18 and the two sides 22, 24, as shown, are left open with the adjustable side walls 12, 14 folded against the front end 20. Alternately, the adjustable side walls 12, 14 may be positioned to wall the sides 22, 24. The adjustable side walls 12, 14 are moved by pivoting them along a generally vertical axis at the intersection 28 of the side walls 12, 14 with the front panel 16 to a position parallel with the front panel 16 of the dump box 10. As previously stated, it is not necessary to provide a separate front panel (though one is shown), the side walls 12, 14 may be configured for pivoting along a generally vertical axis at the intersection of the side walls 12, 14 with the rear of the front cab portion 102 of the utility vehicle 100. In the embodiment shown, the side walls 12, 14 are hinged along the generally vertical axis adjacent the front panel 16 by hinges 30, 32. The side walls 12, 14 may be unsecured from the position along the sides 22, 24, adjusted and moved along paths 34 and 36 to collapse along the front panel 16. The side walls 12, 14 may be secured in the collapsed position using any suitable fastener, a quarter turn fastener being a suitable example. When the side walls 12, 14 are collapsed along the front panel 16, the attachment of the tailgate 18 to the side walls 12, 14 (for example, spring pins of the tailgate inserted into receiving holes on the side walls) is released. The tailgate 18 then opens rearwardly and downwardly to form an extension of the dump box bed 11. When the tailgate 18 is in the open position, a snap-clamp device can be used to hold the tailgate 18 in position and reduce bounding. The snap-clamp device is provided on the bottom of the flatbed with horizontally extending bar 58 of the support structure 52 (more fully described in relation to FIGS. 4 and 5) snapping into the snap-clamp device. In the uncollapsed configuration, the side walls 12, 14 may be secured in position along the sides 22, 24 using any suitable fastener, such as a quarter turn fastener. A standard quarter turn fastener provides quick and simple closure and release. Typically, a quarter turn fastener consists of three parts: a stud, a washer, and a spring clip. The stud can be seen at 51 in FIGS. 4–6. The washer is used for retention of the stud and also provides vibration resistance. The spring clip is installed permanently and is specially designed to ensure that the stud is ejected automatically when turned 90 degrees. In securing the side walls, the spring clip is installed at the perimeter of the dump box bed with the stud extending downwardly from the side walls 12, 14. Additional spring clips are installed along the dump box bed 11 in positions corresponding to collapsed configurations of the side walls 12, 14.

By rotating the side walls 12, 14 into a position generally parallel with and along the front panel 16, the dump box 10 is reconfigured into a flatbed that is unconfined along the sides 22, 24 and has a flat, even surface without the side walls 12, 14 interfering with the driving of the utility vehicle 100. The unconfined flat bed can be used to transport items that would not fit within the confines of the dump box 10. Pivoting the side walls 12, 14 to a position generally parallel with and against the front panel 16, unconfines the flatbed while maintaining a generally uniform bed surface and without interfering with the tires or driving of the utility vehicle 100 or requiring storage of the side walls 12, 14.

FIG. 3 illustrates the dump box 10 of the present invention reconfigured into a truncated dump box and partial flatbed. In this configuration, the side walls 12, 14 are pivoted along hinges 25 placed along a generally vertical axis at a point between the front end 20 and the rear end 26 of the dump box 10. As shown in FIG. 3, the hinges 25 are approximately a third of the way between the front and rear ends 20, 26 of the dump box 10 at a point 19, dividing each side wall 12, 14 into a forward portion and a rearward portion. However, the hinges 25 may be provided at any suitable point along the side walls 12, 14, preferably at a point where the rotated portion of the side walls meet or overlap to form a closed truncated dump box. While hinges 25 are shown for allowing the rearward portion of the side wall to pivot with respect to the forward portion of the side wall 12, 14, any other suitable pivot mechanism may be alternately provided. Further, it is not necessary to provide a pivot point both at the intersection of the side walls 12, 14 with the front panel 16 and at a point 19 along the side walls 12, 14. If desired, a single pivot point along the side walls 12, 14 or at the intersection of the side walls 12, 14 with the front panel 16 may be provided. By pivoting the side walls 12, 14 inwardly along the hinges 25, the dump box 10 is reconfigured into a truncated dump box with a flatbed extending therefrom. The tailgate 18 can be opened and put into a generally horizontal position to extend the flatbed. The side walls 12, 14 may be secured in the truncated dump box configuration using any suitable fastener though a preferred fastener is the quarter turn fastener described above with spring clips installed along the dump box bed 11 in positions corresponding to the collapsed position of the side walls 12, 14 in the truncated dump box bed configuration.

Figure 4:
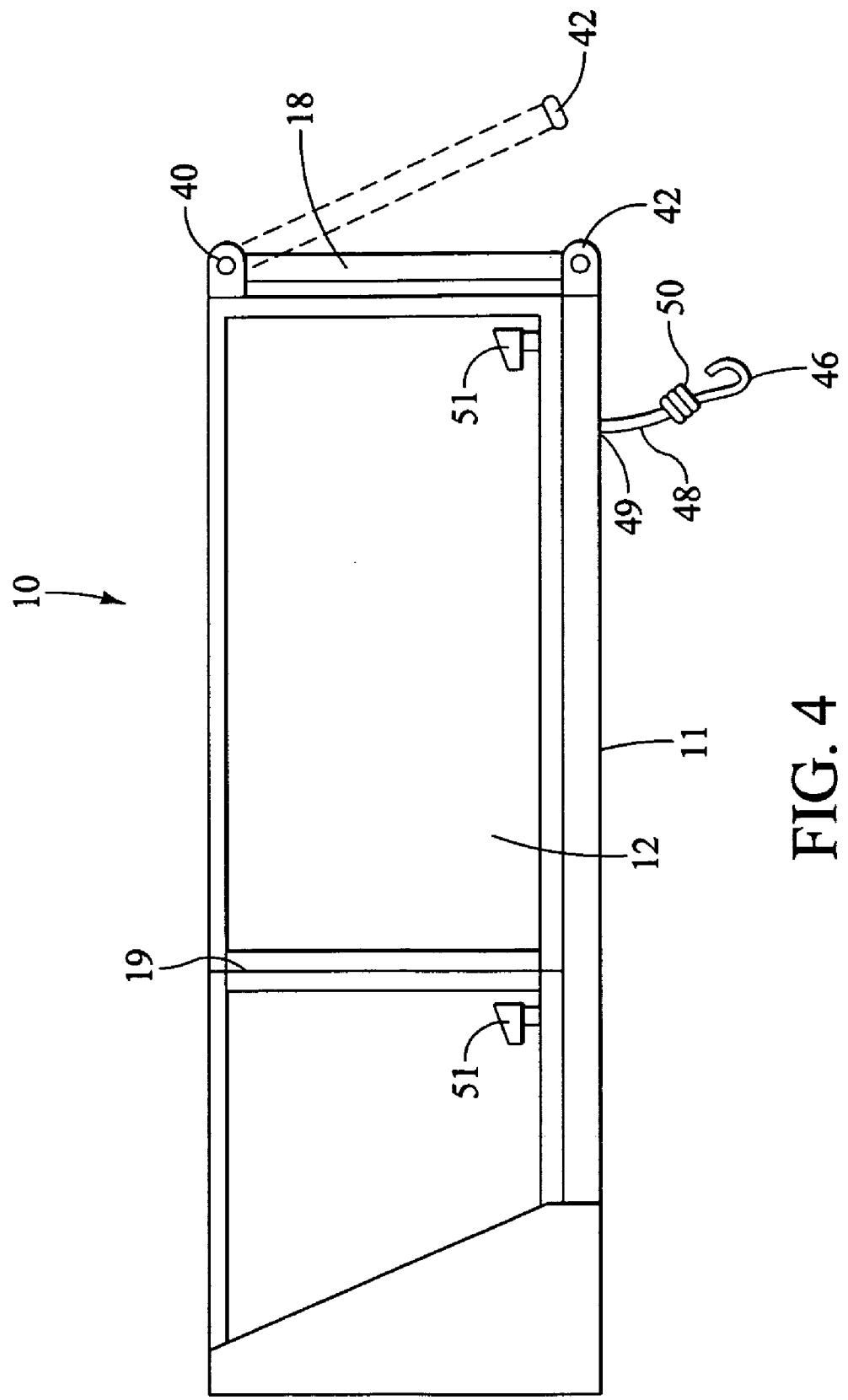
FIG. 4 is a side view of a double swing tailgate of the present invention.
Figure 5:
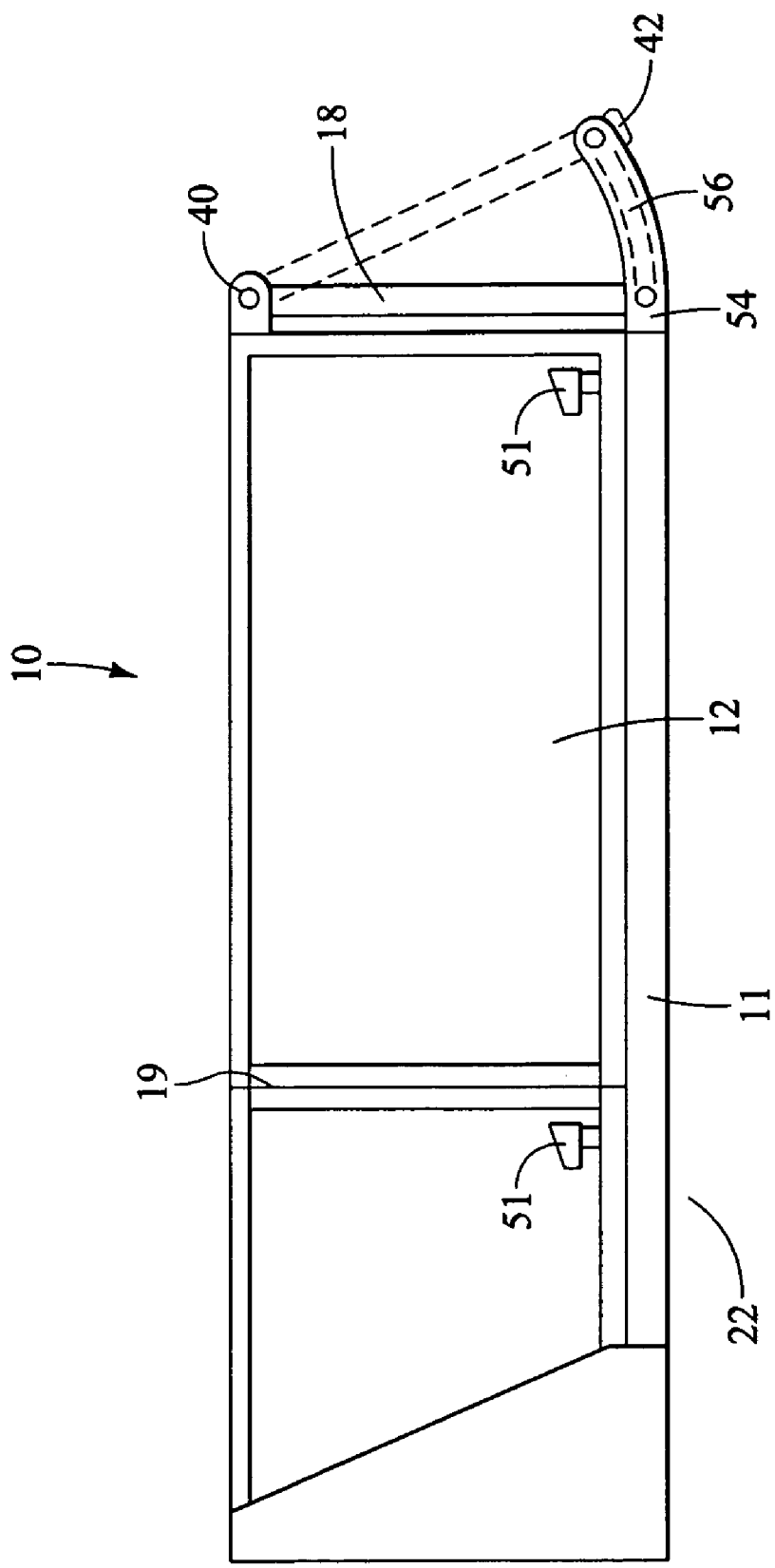
FIG. 5 is a side view of a double swing tailgate of the present invention.
Figure 6:
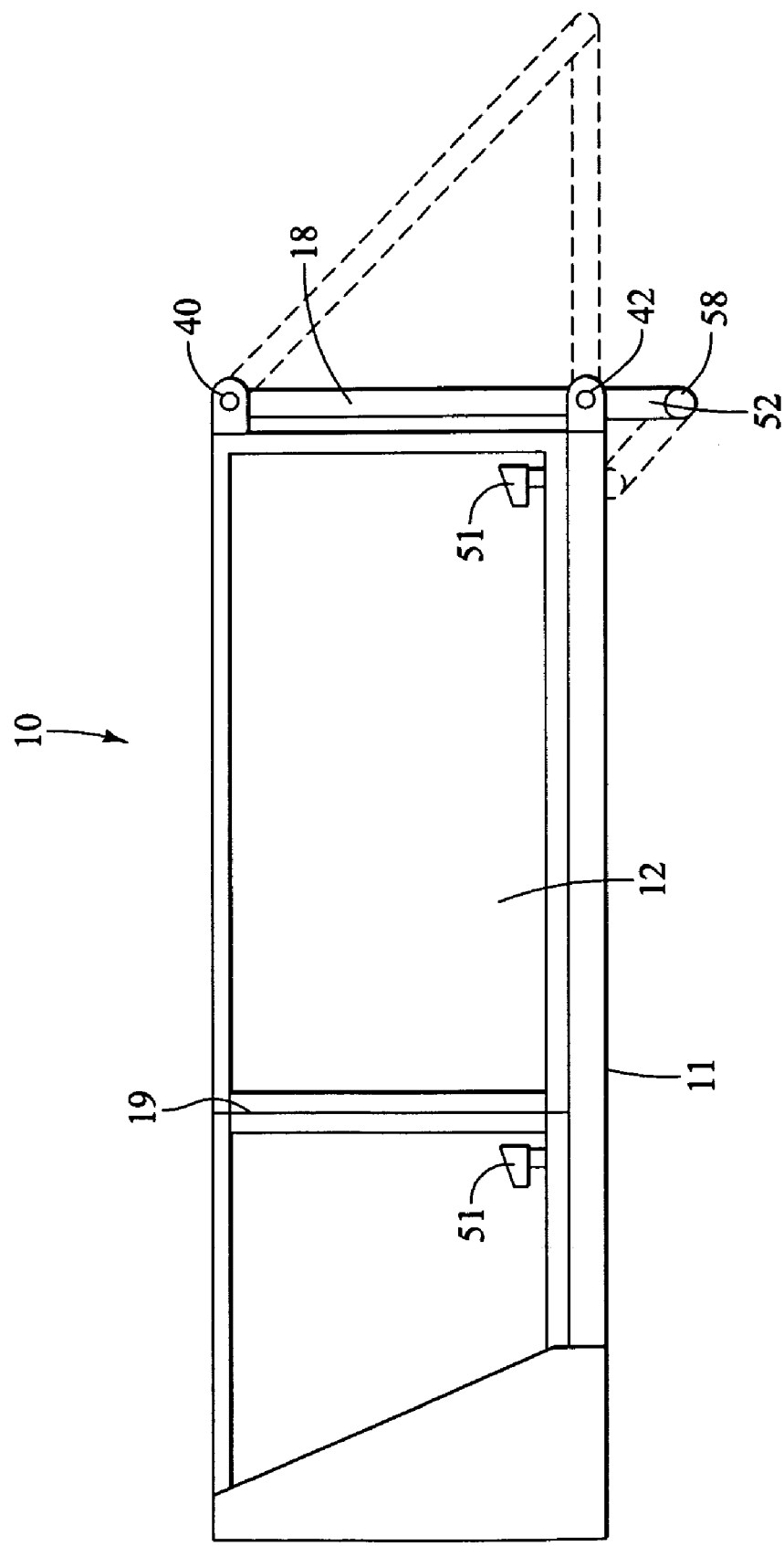
FIG. 6 is a side view of a self-supporting tailgate of the present invention.

FIGS. 4 and 5 illustrate a double swing tailgate 18 of the present invention. The tailgate 18 includes an upper edge 40 and a lower edge 42 and may be rotated upwardly or downwardly. That is, the tailgate 18 may be pivoted along either the upper edge 40 or the lower edge 42. To facilitate opening at both the upper and lower margins, the tailgate 18 is hinged at both the upper and lower margins, allowing the tailgate 18 to pivot about the horizontal of the opposite margin between closed and open positions. A support structure 52 may be provided on the tailgate 18, as seen in FIGS. 1 and 6, for supporting the tailgate in an open, generally horizontal position.

By pivoting the tailgate 18 along the top edge 40, the tailgate 18 is opened from the lower margin. Opening from the lower margin is useful for dumping cargo from the dump box 10. This can done by using a lift to elevate the dump box front end 20, allowing gravity to push the contents of the dump box 10 towards the tailgate 18 and out the opening. When opening from the lower margin, a restraint may be employed to limit the amount of opening. Two suitable restraints are illustrated in FIGS. 4 and 5. However, any other suitable restraint may be used to limit the opening of the tailgate 18 from the lower margin.

As seen in FIG. 4, an adjustable hook 46 and strap 48 may be provided to limit the backward and rearward rotation of the tailgate 18 to control cargo dumping. The strap 48 may be manufactured of any suitable material, for example, nylon. The strap 48 has first and second ends 49, 50 and is adjustable between a minimum and a maximum length. The first end 49 of the strap 48 attaches to the dump box 10 on a bottom side of the dump box bed 11 near the rear end 26. A hook 46 is provided along the strap 48 at its second end 50. The hook 46 is configured for hooking to the bottom edge 42 of the tailgate 18. The tailgate 18 may be provided with a hole in the support structure 52 for receiving the hook 46. Alternately, the hook 46 may be hooked at any suitable location on the tailgate 18. As the front end 20 of the dump box 10 is elevated, the tailgate 18 opens along the lower margin, assuming the rear hinge is removed. The opening is limited by the strap 48 such that once the strap 48 becomes taut, the tailgate 18 can not further open.

FIG. 5 illustrates an alternate method of limiting the upward and rearward rotation of the tailgate 18 about hinge 40. A slotted structure 54 is provided at each side 22, 24 of the dump box 10 extending therefrom. The slotted structure 54 may be folded against the sides 22, 24 of the dump box 10 when not in use. The tailgate 18 is provided with pins (not shown) that can be inserted into the slots 56 of the structure 54. As the front end 20 of the dump box 10 is elevated, the tailgate 18 opens along the lower margin. The opening is limited by the slotted structure 54 such that, once the pins of the tailgate 18 have reached the furthest extent of the slot 56, the tailgate 18 can not further open.

Opening from the upper margin, by pivoting the tailgate 18 along its lower edge 42, is useful for unloading cargo from the tailgate 18. When opening from the upper margin, the tailgate 18 is designed to open outwardly and set on a plane approximately level with the dump box bed 11. As stated above, spring pins (not shown) are provided at each upper corner of the tailgate 18 for retaining the tailgate 18 in its closed position. Corresponding holes are provided in the side walls 12, 14 for receiving the spring pins from the tailgate 18. However, any suitable structure for retaining the tailgate 18 in its closed position may be used. FIG. 6 illustrates the tailgate 18 opened along the upper margin and set on a plane approximately level with the dump box bed 11.

Referring to both FIGS. 6 and 7, the tailgate 18 may be configured to be self-supporting. The tailgate 18 pivots about a horizontal axis located adjacent the dump box bed 11, between a generally vertical closed position and a generally horizontal open position. The tailgate 18 includes a support 52 for supporting the horizontal extension of the tailgate 18 when it is in its open position. The support 52 extends approximately vertically downwards from the tailgate 18 when the tailgate 18 is in a vertical, closed position. The support 52 is provided along the lower edge 42 of the tailgate 18. As seen best in FIG. 1, the support 52 is a horizontally extending bar 58 that is positioned vertically downward from the tailgate 18 by two curved extensions 60. The bar 58 is located approximately centrally between the two sides of the tailgate 18. When the tailgate 18 is moved to a horizontal, open position, the horizontally extending bar 58 abuts the bottom surface of the bed 11. The support 52 provides functional support for the tailgate 18 in the horizontal, open position. The self-supporting nature of the tailgate 18 is particularly useful for when the side walls 12, 14 of the dump box 10 are folded along the front end 20. In this configuration, it would not be possible to have chains or other supporting device extending from the side walls 12, 14 to support the tailgate 18.

FIG. 7, illustrates a rear view of an alternate embodiment of a support 52 for the tailgate 18. Again, the support 52 extends approximately vertically downwards from the tailgate 18 when the tailgate 18 is in a vertical, closed position. The support 52 is provided along the lower edge 42 of the tailgate 18. As shown in FIG. 7, the support 52 is a horizontally extending bar 58 that is positioned vertically downward from the tailgate 18 by three extensions 64, an extension at each side of the bar 58 and one positioned approximately in the middle of the bar 58. The bar 58 is located approximately centrally between the two sides of the tailgate 18. When the tailgate 18 is moved to a horizontal, open position, the horizontally extending bar 58 abuts the bottom surface of the bed 11.

In accordance with the present invention, the dump box may be provided with any or all of the features. That is, the dump box may be provided with adjustable side walls, a double-swing tailgate, or a self-supporting tailgate, or any combination thereof. While a preferred embodiment of the present invention has been described, it should be understood that various changes, adaptations, and modifications may be made therein without departing from the spirit of the invention and the scope of the appended claims.

What is claimed is:

1. A dump box on a utility vehicle having a forward cab portion and a rearward bed portion, the dump box comprising:
   a dump box bed having a front end, first and second sides, and a rear end;
   a front panel provided at the front end, the front panel dividing the forward cab portion of the utility vehicle from the rearward bed portion of the utility vehicle;
   a tailgate provided at the rear end; and
   first and second side walls, a portion of each side wall being pivotable along a generally vertical axis and a rear end of each side wall being removably secured to the tailgate, the side walls being positionable between a first position along the first and second sides respectively and a second position generally parallel with the front panel.

2. The dump box of claim 1, wherein the entire side walls are pivotable with respect to the front panel at a pivot point at the intersection of each side wall with the front panel.

3. The dump box of claim 1, wherein each side wall comprises a forward portion and a rearward portion, the rearward portion being pivotable with the forward portion such that the side walls may be folded to form a truncated dump box.

4. The dump box of claim 1, wherein the tailgate has a top edge and a bottom edge and is configured for pivoting along either the top edge or the bottom edge, the tailgate further being adjustable between a closed vertical position and an open horizontal position.

5. The dump box of claim 4, further including a strap for limiting the upward rotation of the tailgate.

6. The dump box of claim 5, wherein the strap has first and second ends and is adjustable between a minimum and a maximum length, the second end further including a hook, the first end being attachable to the dump box and the second end being attachable to the tailgate.

7. The dump box of claim 6, wherein the tailgate includes a hole for receiving the hook.

8. The dump box of claim 4, further including first and second slotted structures extending rearwardly from the sides of the dump box bed, the slotted structures each including a slot for receiving a projection from the tailgate.

9. The dump box of claim 8, wherein the tailgate includes first and second pins extending from lower right and left sides of the tailgate, the slots being configured for receiving the first and second pins.

10. The dump box of claim 1, wherein the tailgate is adjustable between a closed vertical position and an open generally horizontal position.

11. The dump box of claim 10, further including a lower support provided at the bottom edge of the tailgate for supporting the tailgate in the open generally horizontal position, the lower support extending vertically downwards from the tailgate when the tailgate is in the closed vertical position, and abutting the dump box bed when the tailgate is in the open generally horizontal position.

12. The dump box of claim 11, wherein the lower support comprises two vertical extensions having first and second ends, the first ends attached to the bottom edge of the tailgate and the second ends attached to a horizontal bar.

13. The dump box of claim 1, wherein the first and second side walls are positionable between a first position along the first and second sides respectively and a second position along the front panel wherein the second position is substantially parallel with and against the front panel.

14. A dump box for a utility vehicle having a forward cab portion and a rearward bed portion, the dump box comprising:
   a dump box bed having a front end, first and second sides, and a rear end;
   a front panel provided at the front end, the front panel dividing the forward cab portion of the utility vehicle from the rearward bed portion of the utility vehicle;
   first and second side walls, a front end of each side wall being pivotable along a generally vertical axis and a rear end of each side wall being removably secured to the tailgate, the side walls being positionable between a first position along the first and second sides respectively and a second position along the front panel;
   a tailgate provided at the rear end, the tailgate including a top edge and a bottom edge and being adjustable between a closed generally vertical position and an open generally horizontal position; and
   a lower support provided at the bottom edge of the tailgate for supporting the tailgate in the open generally horizontal position, the lower support extending generally vertically downwards from the tailgate when the tailgate is in the closed generally vertical position, and abutting the dump box bed when the tailgate is in the open generally horizontal position.

15. The dump box of claim 14, wherein the lower support comprises two generally vertical extensions having first and second ends, the first ends attached to the bottom edge of the tailgate and the second ends attached to a generally horizontal bar.

16. The dump box of claim 14, wherein the tailgate is configured for pivoting along either the top edge or the bottom edge.

17. The dump box of claim 16, further including a strap for limiting the upward rotation of the tailgate.

18. The dump box of claim 17, wherein the strap has first and second ends and is adjustable between a minimum and a maximum length, the second end further including a hook, the first end being attachable to the dump box and the second end being attachable to the tailgate.

19. The dump box of claim 17, wherein the tailgate includes a hole for receiving the hook.

20. The dump box of claim 16, further including first and second slotted structures extending rearwardly from the sides of the dump box bed, the slotted structures each including a slot for receiving a projection from the tailgate.

21. The dump box of claim 20, wherein the tailgate includes first and second pins extending from lower right and left sides of the tailgate, the slots being configured for receiving the first and second pins.

22. The dump box of claim 14, wherein the second position is substantially parallel with and against the front panel.

23. The dump box of claim 14, wherein each side wall comprises a forward portion and a rearward portion, the rearward portion being pivotable with the forward portion such that the side walls may be folded to form a truncated dump box.

24. A dump box for a utility vehicle having a forward cab portion and a rearward bed portion, the dump box comprising:
   a dump box bed having a front end, first and second sides, and a rear end;
   a front panel provided at the front end, the front panel dividing the forward cab portion of the utility vehicle from the rearward bed portion of the utility vehicle;
   a tailgate provided at the rear end; and first and second side walls, a front end of each side wall being pivotable along a generally vertical axis and a rear end of each side wall being removably secured to the tailgate, the side walls being positionable between a first position along the first and second sides respectively and a second position along the front panel wherein the second position is substantially parallel with and against the front panel.

25. The dump box of claim 24, wherein each side wall comprises a forward portion and a rearward portion, the rearward portion being pivotable with the forward portion such that the side walls may be folded to form a truncated dump box.

26. The dump box of claim 24, wherein the tailgate has a top edge and a bottom edge and is configured for pivoting along either the top edge or the bottom edge, the tailgate further being adjustable between a closed vertical position and an open horizontal position.

27. The dump box of claim 26, further including a strap for limiting the upward rotation of the tailgate.

28. The dump box of claim 27, wherein the strap has first and second ends and is adjustable between a minimum and a maximum length, the second end further including a hook, the first end being attachable to the dump box and the second end being attachable to the tailgate.

29. The dump box of claim 28, wherein the tailgate includes a hole for receiving the hook.

30. The dump box of claim 26, further including first and second slotted structures extending rearwardly from the sides of the dump box bed, the slotted structures each including a slot for receiving a projection from the tailgate.

31. The dump box of claim 30, wherein the tailgate includes first and second pins extending from lower right and left sides of the tailgate, the slots being configured for receiving the first and second pins.

32. The dump box of claim 24, wherein the tailgate is adjustable between a closed generally vertical position and an open generally horizontal position.

33. The dump box of claim 32, further including a lower support provided at a bottom edge of the tailgate for supporting the tailgate in the open generally horizontal position, the lower support extending generally vertically downwards from the tailgate when the tailgate is in the closed generally vertical position, and abutting the dump box bed when the tailgate is in the open generally horizontal position.

34. The dump box of claim 33, wherein the lower support comprises two generally vertical extensions having first and second ends, the first ends attached to the bottom edge of the tailgate and the second ends attached to a generally horizontal bar.

* * * * *